United States Patent
Kim et al.

(10) Patent No.: US 9,252,405 B2
(45) Date of Patent: Feb. 2, 2016

(54) RECHARGEABLE SECONDARY BATTERY

(71) Applicants: SAMSUNG SDI CO., LTD., Yongin-si, Gyeonggi-do (KR); ROBERT BOSCH GMBH, Stuttgart (DE)

(72) Inventors: In Kim, Yongin-si (KR); Dukjung Kim, Yongin-si (KR); Joongheon Kim, Yongin-si (KR); Sookyoung Yoo, Yongin-si (KR); Hyungsik Kim, Yongin-si (KR); Zin Park, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 353 days.

(21) Appl. No.: 13/654,342

(22) Filed: Oct. 17, 2012

(65) Prior Publication Data

US 2013/0323546 A1 Dec. 5, 2013

(30) Foreign Application Priority Data

Jun. 4, 2012 (KR) .......................... 10-2012-0059980

(51) Int. Cl.
*H01M 2/00* (2006.01)
*H01M 2/10* (2006.01)
*H01M 2/26* (2006.01)
*H01M 10/04* (2006.01)
*H01M 10/42* (2006.01)

(52) U.S. Cl.
CPC .......... *H01M 2/1061* (2013.01); *H01M 2/1066* (2013.01); *H01M 2/266* (2013.01); *H01M 10/0436* (2013.01); *H01M 10/425* (2013.01); *H01M 2200/00* (2013.01)

(58) Field of Classification Search
None
See application file for complete search history.

(56) References Cited

U.S. PATENT DOCUMENTS

| | | | |
|---|---|---|---|
| 2003/0027036 A1* | 2/2003 | Emori et al. | 429/61 |
| 2003/0099077 A1* | 5/2003 | Chu et al. | 361/93.9 |
| 2005/0238953 A1* | 10/2005 | Urso et al. | 429/163 |
| 2007/0210760 A1* | 9/2007 | Shimamura et al. | 320/135 |
| 2007/0269711 A1* | 11/2007 | Meguro et al. | 429/94 |
| 2009/0096419 A1* | 4/2009 | White et al. | 320/118 |
| 2009/0236745 A1 | 9/2009 | Vrtis et al. | |
| 2010/0279160 A1 | 11/2010 | Lee et al. | |
| 2011/0104528 A1* | 5/2011 | Byun et al. | 429/61 |
| 2013/0149570 A1* | 6/2013 | Han et al. | 429/61 |

FOREIGN PATENT DOCUMENTS

| | | |
|---|---|---|
| KR | 10-2011-0019398 | 2/2011 |
| KR | 10-2011-0022509 | 3/2011 |

* cited by examiner

*Primary Examiner* — Patrick Ryan
*Assistant Examiner* — Jose Colucci Rios
(74) *Attorney, Agent, or Firm* — Christie, Parker & Hale, LLP

(57) ABSTRACT

A secondary battery including a first electrode assembly, a second electrode assembly, a case accommodating the first and second electrode assemblies, a terminal part electrically connected to the first and second electrode assemblies, and exposed to an outside of the case, and a plurality of short circuit inducing members between the first electrode assembly and the case, between the second electrode assembly and the case, and between the first electrode assembly and the second electrode assembly.

15 Claims, 10 Drawing Sheets

RECHARGEABLE SECONDARY BATTERY

CROSS-REFERENCE TO RELATED APPLICATION

This application claims priority to and the benefit of Korean Patent Application No. 10-2012-0059980, filed on Jun. 4, 2012 in the Korean Intellectual Property Office, the entire content of which is incorporated herein by reference.

BACKGROUND

1. Field

Aspects of embodiments of the present invention relate to a secondary battery.

2. Description of the Related Art

Lithium ion secondary batteries are widely used in small electronic devices, such as notebook computers and cellular phones. Such lithium ion secondary batteries are superior to other types of secondary batteries in terms of power, capacity, and weight, and can also be used in hybrid vehicles and electric vehicles.

Lithium ion secondary batteries for vehicles should satisfy the requirements of safety and reliability under harsh conditions. A penetrating test, a squeezing test, and an overcharging test are the harshest ones of safety tests.

Of these safety tests, the penetrating test is very important in predicting damage to a secondary battery due to a vehicle accident. Particularly, the penetrating test requires that even after a nail penetrates a secondary battery, the temperature of the secondary battery does not excessively increase, or the secondary battery is not ignited or burned.

SUMMARY

According to an aspect of embodiments of the present invention, in a secondary battery, electrode assemblies are prevented or substantially prevented from being ignited and/or excessively heated after penetration of a nail or the like.

According to another aspect of embodiments of the present invention, in a secondary battery, first and second electrode assemblies are prevented or substantially prevented from being ignited and/or excessively heated even though an inner short circuit is formed therebetween, by forming a current path through which inner short circuit current can quickly flow out.

According to another aspect of embodiments of the present invention, a secondary battery has improved safety and reliability together with high performance. As such, a secondary battery according to embodiments of the present invention is suited for use in an electric vehicle or a hybrid vehicle.

According to an embodiment of the present invention, a secondary battery includes: a first electrode assembly, a second electrode assembly, a case accommodating the first and second electrode assemblies, a terminal part electrically connected to the first and second electrode assemblies, and exposed to an outside of the case, and a plurality of short circuit inducing members between the first electrode assembly and the case, between the second electrode assembly and the case, and between the first electrode assembly and the second electrode assembly.

The plurality of short circuit inducing members may include: a plurality of first short circuit inducing members arranged at opposite side surfaces of the first electrode assembly and opposite side surfaces of the second electrode assembly; and a second short circuit inducing member between the first electrode assembly and the second electrode assembly.

In one embodiment, each of the first and second electrode assemblies includes: a first electrode plate, a second electrode plate, and a separator between the first and second electrode plates; a first non-coating portion of the first electrode plate, the first non-coating portion not coated with a first active material and protruding from a side of the separator; and a second non-coating portion of the second electrode plate, the second non-coating portion not coated with a second active material and protruding from another side of the separator, the first short circuit inducing members of the plurality of first short circuit inducing members are connected to the first non-coating portions of the first and second electrode assemblies, and the second short circuit inducing member is connected to the second non-coating portion of at least one of the first electrode assembly or the second electrode assembly.

The second short circuit inducing member may be connected to the second non-coating portions of both the first and second electrode assemblies.

The second short circuit inducing member may include a first region connected to the second non-coating portion of the first electrode assembly, a second region connected to the second non-coating portion of the second electrode assembly, and a cut part between the first and second regions.

The first short circuit inducing members may be portions of the first electrode plates wound around outermost portions of the respective first and second electrode assemblies, and the second short circuit inducing member may have a substantially tetragonal plate shape between first short circuit inducing members of the plurality of first short circuit inducing members arranged between the first and second electrode assemblies.

The first short circuit inducing members wound at least one time around the outermost portions of the respective first and second electrode assemblies may not be coated with the first active material.

The case and the second short circuit inducing member may have a same polarity.

First short circuit inducing members of the plurality of first short circuit inducing members and the second short circuit inducing member may have substantially tetragonal plate shapes.

The first short circuit inducing members may include copper or a copper allay.

The second short circuit inducing member may include aluminum or an aluminum alloy.

The secondary battery may further include an insulating plate between a first short circuit inducing member of the plurality of first short circuit inducing members and the case.

The secondary battery may further include an insulating plate between a first short circuit inducing member of the plurality of first short circuit inducing members and the second short circuit inducing member.

According to another embodiment of the present invention, a secondary battery includes: a plurality of electrode assemblies; a case accommodating the electrode assemblies; a plurality of terminal parts electrically connected to the electrode assemblies, and exposed to an outside of the case; and a plurality of short circuit inducing members between the electrode assemblies and the case, and between the electrode assemblies.

The plurality of short circuit inducing members may include: a plurality of first short circuit inducing members arranged at opposite side surfaces of each of the electrode assemblies; and at least one second short circuit inducing member between the electrode assemblies.

BRIEF DESCRIPTION OF THE DRAWINGS

The accompanying drawings are included to provide a further understanding of the present disclosure, and are incorporated in and constitute a part of this specification. The drawings illustrate some exemplary embodiments of the present invention and, together with the description, serve to explain principles and aspects of the present invention. In the drawings.

DETAILED DESCRIPTION

Some exemplary embodiments of the present invention are described more fully hereinafter with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

Figure 1A:
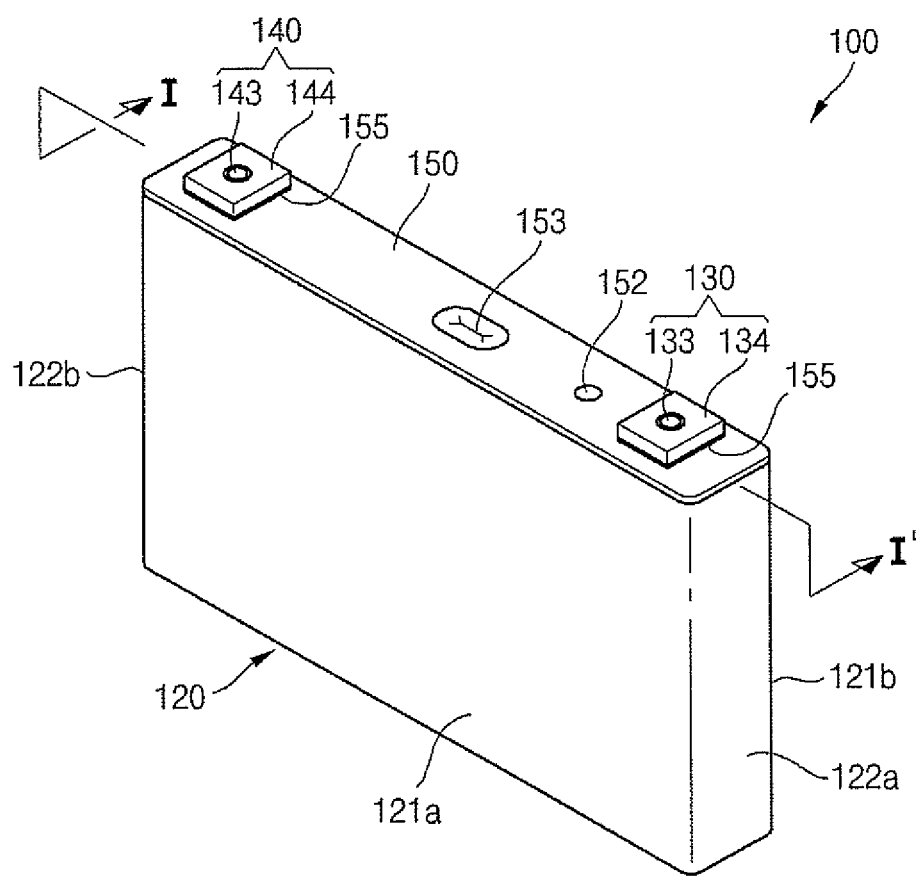
FIGS. 1A to 1C are a perspective view, a vertical cross-sectional view taken along the line I-I', and a horizontal cross-sectional view, respectively, of a secondary battery according to an embodiment of the present invention.
Figure 1B:
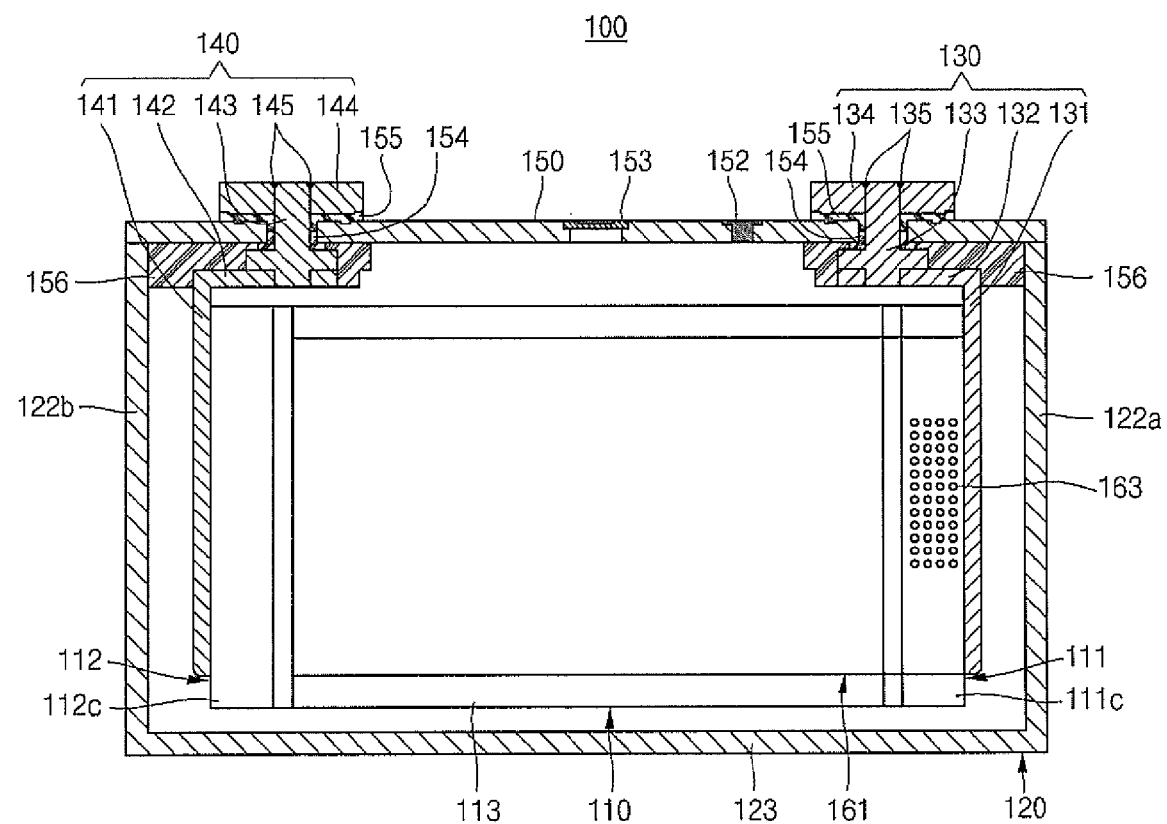
Figure 1C:
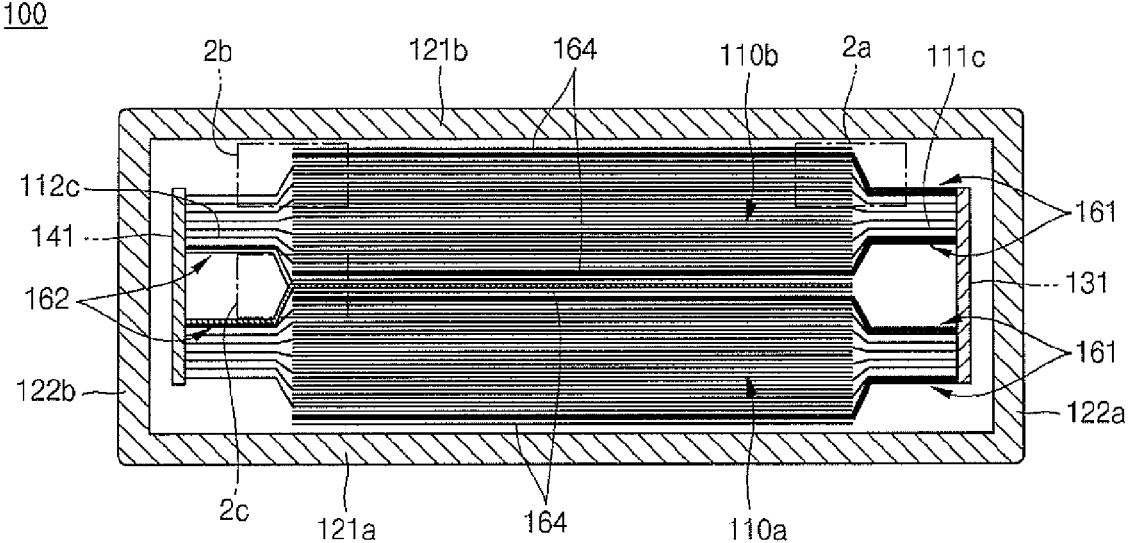

FIGS. 1A to 1C are a perspective view, a vertical cross-sectional view taken along the line I-I', and a horizontal cross-sectional view, respectively, of a secondary battery according to an embodiment of the present invention.

Referring to FIGS. 1A to 1C, a secondary battery 100 according to an embodiment of the present invention includes a plurality of electrode assemblies 110, a case 120, a first terminal part 130, a second terminal part 140, a cap plate 150, and a plurality of short circuit inducing members 161 and 162. In one embodiment, as shown in FIG. 1C, the electrode assemblies 110 include two electrode assemblies 110a and 110b. However, the number of electrode assemblies 110 is not limited thereto. The number of the short circuit inducing members 161 and 162 is proportional to the number of the electrode assemblies 110.

The electrode assembly 110a, which is also referred to as a first electrode assembly, includes a first electrode plate 111, a second electrode plate 112, and a separator 113. The electrode assembly 110a may have a generally wound jelly roll structure or a stacked structure.

The electrode assembly 110b, which is also referred to as a second electrode assembly 110b, is adjacent to a side of the first electrode assembly 110a, and, in one embodiment, has substantially the same structure as that of the first electrode assembly 110a. Therefore, the first electrode assembly 110a will be representatively described below. For convenience of description, like reference numerals denote like elements in the first and second electrode assemblies 110a and 110b.

In one embodiment, the first electrode plate 111 may be a negative electrode plate, and the second electrode plate 112 may be a positive electrode plate. In another embodiment, the first electrode plate 111 may be a positive electrode plate, and the second electrode plate 112 may be a negative electrode plate. The first electrode plate 111, in one embodiment, includes a first metal foil 111a and a first active material 111b. When the first electrode plate 111 is a negative electrode plate, the first metal foil 111a may be formed of copper or a copper alloy, and the first active material 111b may be graphite. The second electrode plate 112, in one embodiment, includes a second metal foil 112a and a second active material 112b. When the second electrode plate 112 is a positive electrode plate, the second metal foil 112a may be formed of aluminum or an aluminum alloy, and the second active material 112b may be a lithium-based oxide. However, the present invention is not limited to the above described materials. The separator 113 is disposed between the first electrode plate 111 and the second electrode plate 112. The separator 113 may be formed of porous polyethylene (PE), polypropylene (PP), or an equivalent thereof, but is not limited thereto. The separator 113 may be disposed substantially on both side surfaces of the first electrode plate 111 or the second electrode plate 112. The separator 113 is disposed on the outermost portion of the first and second electrode assemblies 110a and 110b to prevent or substantially prevent a portion of the first and second electrode assemblies 110a and 110b from being directly short-circuited to the case 120, the cap plate 150, or the short circuit inducing members 161 and 162.

The first electrode plate 111, in one embodiment, includes a first non-coating portion 111c on which the first active material 111b is not formed. The first non-coating portion 111c may protrude outward through a side of the separator 113. The second electrode plate 112, in one embodiment, includes a second non-coating portion 112c on which the second active material 112b is not formed. The second non-coating portion 112c may protrude outward through another side of the separator 113. That is, a protruding direction of the first non-coating portion 111c may be opposite to that of the second non-coating portion 112c with respect to the separator 113.

The case 120, in one embodiment, includes two wide side parts 121a and 121b, two narrow side parts 122a and 122b, and a bottom 123. The case 120 has a top opening. The case 120 accommodates the first and second electrode assemblies 110a and 110b and electrolyte. In one embodiment, the first non-coating portion 111c and the second non-coating portion 112c are arranged toward the narrow side parts 122a and 122b, respectively. The case 120 may be formed of aluminum, an aluminum alloy, copper, a copper alloy, iron, an iron alloy, stainless steel, or an equivalent thereof, but a material used to form the case 120 is not limited thereto.

The first terminal part 130 is electrically connected to the first electrode plates 111 of the first and second electrode assemblies 110a and 110b. In one embodiment, the first terminal part 130 includes a first region 131 welded to the first non-coating portions 111c; a second region 132 bent from the first region 131 and extended (e.g., horizontally extended) a certain length; a third region 133 coupled to the second region 132 and passing through the cap plate 150; and a fourth region 134 coupled to the third region 133. In one embodiment, a welded region 135 is formed by welding the third region 133 and the fourth region 134, such as through a laser beam welding process.

The second terminal part 140 is electrically connected to the second electrode plates 112 of the first and second electrode assemblies 110a and 110b. In one embodiment, the second terminal part 140 may be welded to the second electrode plates 112. In one embodiment, the second terminal part 140 includes a first region 141 welded to the second non-coating portions 112c; a second region 142 bent from the first region 141 and extended (e.g., horizontally extended) a certain length; a third region 143 coupled to the second region 142 and passing through the cap plate 150; and a fourth region 144 coupled to the third region 143. In one embodiment, a welded region 145 is formed by welding the third region 143 and the fourth region 144, such as through a laser beam welding process.

In one embodiment, a portion of the fourth region 144 may be directly and electrically connected to the cap plate 150. The fourth region 144 may be connected to the cap plate 150 through a high-resistance member (not shown) such as stainless steel, and the cap plate 150 and the case 120 may have the same polarity as that of the second terminal part 140 (e.g., a positive polarity).

The cap plate 150, through which the first terminal part 130 and the second terminal part 140 are exposed or protruded, covers the top opening of the case 120. A boundary between the case 120 and the cap plate 150 may be welded, such as using a laser beam. The third regions 133 and 143 of the respective first and second terminal parts 130 and 140 pass through the cap plate 150. Insulation seal gaskets 154 may be disposed at peripheries of the third regions 133 and 143, respectively. Thus, the third regions 133 and 143 may be insulated from the cap plate 150. However, in one embodiment, the fourth region 144 may be connected to the cap plate 150 through a high-resistance member, as described above, and the cap plate 150 and the case 120 may have a polarity (e.g., a positive polarity). Upper insulating members 155 may be disposed between the cap plate 150 and the fourth regions 134 and 144. Lower insulating members 156 may be disposed between the cap plate 150 and the second regions 132 and 142.

In one embodiment, an electrolyte plug 152 may be coupled to the cap plate 150. A safety vent 153 that may be thinner than the electrolyte plug 152 may be disposed in the cap plate 150. In one embodiment, the cap plate 150 and the case 120 may be formed of a same material.

The short circuit inducing members 161 and 162 include a first short circuit inducing members 161 disposed on both side surfaces of the first and second electrode assemblies 110a and 110b, respectively; and second short circuit inducing members 162 disposed between the first and second electrode assemblies 110a and 110b.

The first short circuit inducing members 161 are disposed on both side surfaces of the first and second electrode assemblies 110a and 110b, and one of the first short circuit inducing members 161 directly faces the case 120, such that one of the first short circuit inducing members 161 is disposed between the wide side part 121a or 121b and a large side surface of the first or second electrode assembly 110a or 110b.

The second short circuit inducing members 162 are disposed between the first and second electrode assemblies 110a and 110b, and both side surfaces of the second short circuit inducing members 162 directly face the first short circuit inducing members 161. That is, the second short circuit inducing members 162 are disposed between the first short circuit inducing members 161.

Insulating plates 164 are disposed between the case 120 and the first short circuit inducing members 161. In addition, insulating plates 164 are disposed between the first short circuit inducing members 161 and the second short circuit inducing members 162. The insulating plates 164 insulate the case 120 from the first short circuit inducing members 161, and insulate the first short circuit inducing members 161 from the second short circuit inducing members 162, until an inner short circuit is formed by penetration of a nail or the like. Like the separator 113, the insulating plates 164 may be formed of porous polyethylene (PE), polypropylene (PP), or an equivalent thereof, but are not limited thereto.

The first short circuit inducing members 161 are electrically connected to the first non-coating portion 111c of the first electrode plate 111. In one embodiment, the first short circuit inducing members 161 may be welded to the first non-coating portion 111c, and a welded region 163 may be disposed between the first short circuit inducing member 161 and the first non-coating portion 111c.

The second short circuit inducing member 162 is electrically connected to the second non-coating portion 112c of the second electrode plate 112. In one embodiment, the second short circuit inducing member 162 may be welded to the second non-coating portion 112c.

Thus, when a nail or the like penetrating the secondary battery 100 tears or damages the insulating plates 164, a short circuit is directly and electrically formed between the case 120 and the first short circuit inducing members 161 and/or between the first short circuit inducing members 161 and the second short circuit inducing member 162. In one embodiment, the first and second short circuit inducing members 161 and 162 have a greater electrical conductivity than the electrode assembly 110, such that the first and second short circuit inducing members 161 and 162 substantially do not generate heat during short circuiting, and quickly consume a large current. Thus, when a nail or the like penetrates the secondary battery 100, the secondary battery 100 substantially does not generate heat and ignite, thereby improving penetration safety and reliability thereof.

Furthermore, the secondary battery 100 substantially does not generate heat and ignite, regardless of a penetrating direction of a nail or the like penetrating the case 120, such as whether a nail penetrates the wide side part 121a or 121b of the case 120, thereby improving the penetration safety and reliability of the secondary battery 100, which will be described further later herein.

The first and second short circuit inducing members 161 and 162, in one embodiment, are provided in the form of a thick plate so as to support the first and second electrode assemblies 110a and 110b and to suppress swelling of the case 120.

Figure 2A:
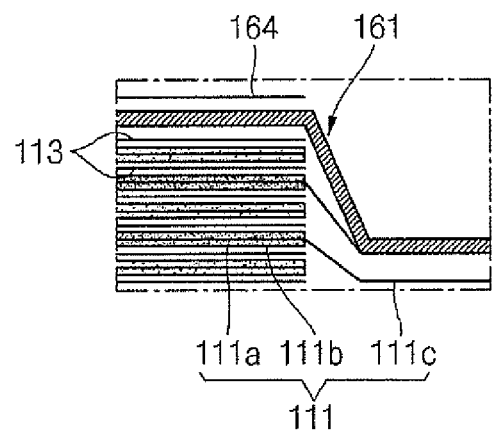
FIGS. 2A to 2C are enlarged views illustrating regions 2a to 2c, respectively, of FIG. 1C.
Figure 2B:
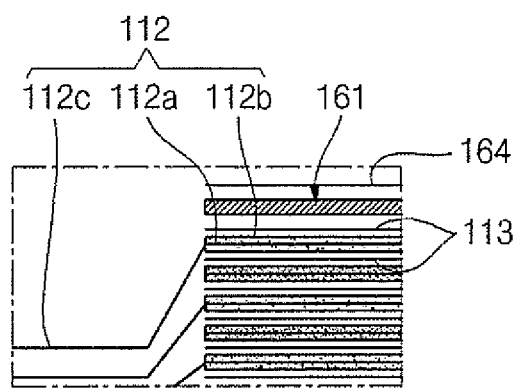
Figure 2C:
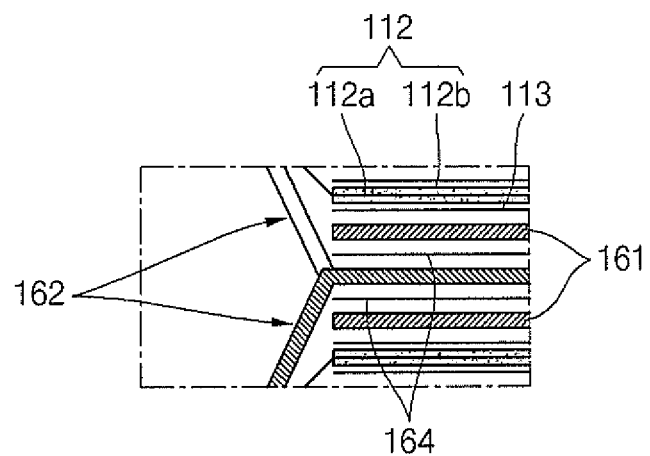

FIGS. 2A to 2C are enlarged views illustrating regions 2a to 2c, respectively, of FIG. 1C.

Referring to FIG. 2A, the first electrode plate 111 of the second electrode assembly 110b includes the first metal foil 111a (e.g., a copper foil), the first active material 111b (e.g., graphite), and the first non-coating portion 111c on which the first active material 111b is not formed.

Referring to FIG. 2B, the second electrode plate 112 of the second electrode assembly 110b includes the second metal foil 112a (e.g., an aluminum foil or an aluminum mesh), the second active material 112b (e.g., a lithium-based oxide), and the second non-coating portion 112c on which the second active material 112b is not formed.

The separator 113, which is formed of PE or PP, is disposed at opposite surfaces of the first electrode plate 111. Also, the separator 113 is disposed at opposite surfaces of the second electrode plate 112.

The first non-coating portion 111c extends outward through a side of the separator 113. The first non-coating portion 111c may tightly contact the first region 131 of the first terminal part 130, such that the first non-coating portion 111c may be welded to the first region 131 more efficiently. The first short circuit inducing member 161, in one embodiment, is welded to the first non-coating portion 111c.

The second non-coating portion 112c also extends outward through another side of the separator 113. The second non-coating portion 112c may tightly contact the first region 141 of the second terminal part 140, such that the second non-coating portion 112c may be welded to the first region 141 more efficiently. The second short circuit inducing member 162, in one embodiment, is welded to the second non-coating portion 112c.

Referring to FIG. 2C, the second short circuit inducing member 162 may be disposed between the first short circuit inducing members 161, and the insulating plates 164 may be disposed between the second short circuit inducing member 162 and the first short circuit inducing members 161.

Figure 3:
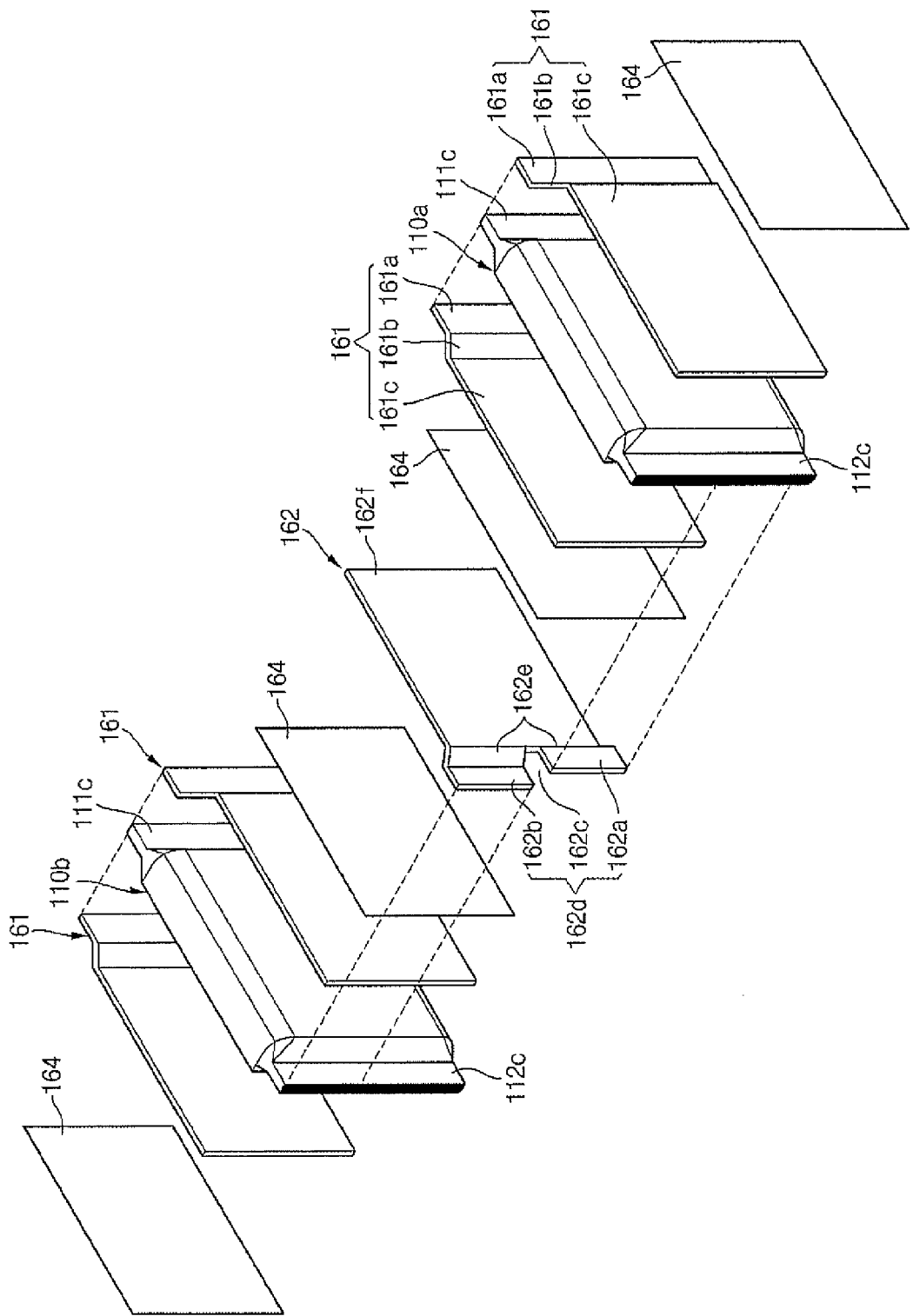
FIG. 3 is an exploded perspective view illustrating first and second electrode assemblies and first and second short circuit inducing members of the secondary battery of FIGS. 1A to 1C.

FIG. 3 is an exploded perspective view illustrating the first and second electrode assemblies 110a and 110b and the first and second short circuit inducing members 161 and 162 of the secondary battery 100.

Referring to FIG. 3, the first short circuit inducing members 161 are electrically connected to the first non-coating portions 111c of the first and second electrode assemblies 110a and 110b. In one embodiment, two of the first short circuit inducing members 161 are welded to the first non-coating portion 111c of the first electrode assembly 110a to face the first non-coating portion 111c, and another two of the first short circuit inducing members 161 are welded to the first non-coating portion 111c of the second electrode assembly 110b to face the first non-coating portion 111c. Accordingly, in one embodiment, a pair of wide side surfaces of the first electrode assembly 110a are substantially covered with the first two of the first short circuit inducing members 161, and a pair of wide side surfaces of the second electrode assembly 110b are substantially covered with the second two of the first short circuit inducing members 161. In one embodiment, pairs of narrow side surfaces of the first and second electrode assemblies 110a and 110b are not covered with the first short circuit inducing members 161.

In one embodiment, each of the first short circuit inducing members 161 includes a first flat 161a welded to the first non-coating portion 111c; a bent part 161b bent and extended at an angle from the first flat 161a; and a second flat 161c extending a length from the bent part 161b. The bent part 161b corresponds to a bent region of the first non-coating portion 111c, and the second flat 161c corresponds to the wide side surface of a corresponding one of the first electrode assembly 110a or the second electrode assembly 110b. Accordingly, in one embodiment, the first short circuit inducing members 161 efficiently and tightly contact the wide side surfaces of the first and second electrode assemblies 110a and 110b at the front and rear sides thereof.

In another embodiment, the first short circuit inducing member 161 may be provided in the form of an approximately flat plate, without the first flat 161a, the bent part 161b, and the second flat 161c, and, thus, the shape and form of the first short circuit inducing members 161 are not specifically limited.

At least one of the second short circuit inducing members 162 is disposed between the first and second electrode assemblies 110a and 110b. That is, the second short circuit inducing member 162 is disposed between two of the first short circuit inducing members 161. In one embodiment, the insulating plates 164 are disposed between two of the first short circuit inducing members 161 and one of the second short circuit inducing members 162.

Like the first short circuit inducing member 161, the second short circuit inducing member 162 includes a first flat 162d, a bent part 162e, and a second flat 162f. However, in one embodiment, the first flat 162d includes a first region 162a and a second region 162b electrically connected to the second non-coating portions 112c of the first and second electrode assemblies 110a and 110b. In one embodiment, a cut part 162c is disposed between the first region 162a and the second region 162b, such that the first region 162a is bent toward the second non-coating portion 112c of the first electrode assembly 110a, and is connected thereto, and the second region 162b is bent toward the second non-coating portion 112c of the second electrode assembly 110b, and is connected thereto. In one embodiment, the first region 162a of the first flat 162d is welded to the second non-coating portion 112c of the first electrode assembly 110a, and the second region 162b is welded to the second non-coating portion 112c of the second electrode assembly 110b.

Although not shown, in one embodiment, the second short circuit inducing member 162 may be provided as two second short circuit inducing members 162, such that one of the second short circuit inducing members 162 is connected to the second non-coating portion 112c of the first electrode assembly 110a, and the other is connected to the second non-coating portion 112c of the second electrode assembly 110b.

Figure 4A:
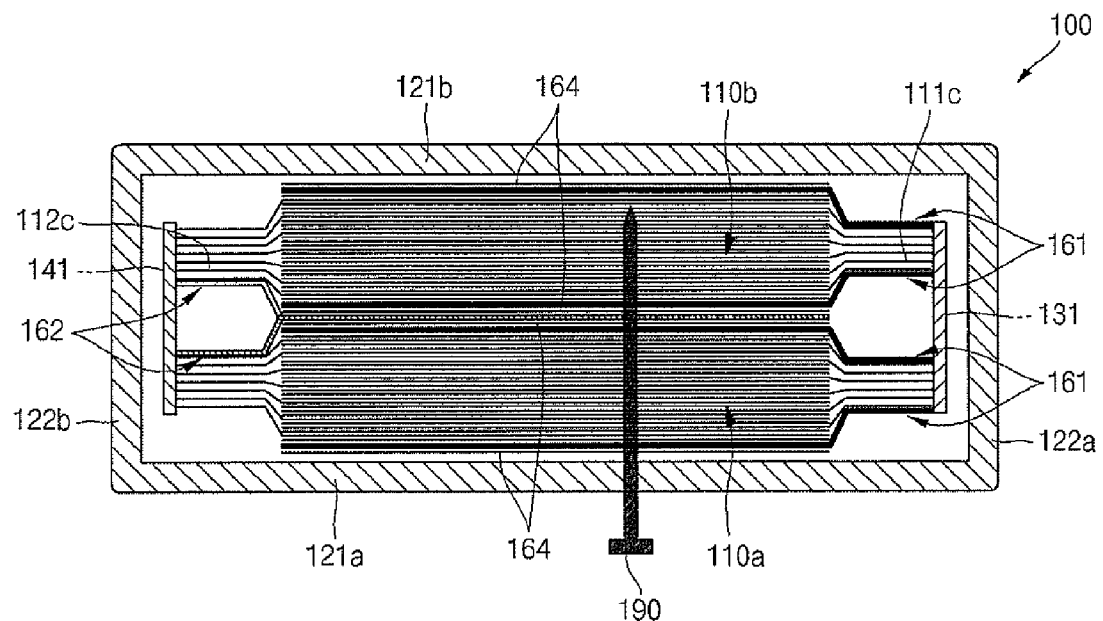
FIGS. 4A and 4B are horizontal cross-sectional views illustrating states in which an inner short circuit is formed by a nail penetrating the secondary battery of FIGS. 1A to 1C.
Figure 4B:
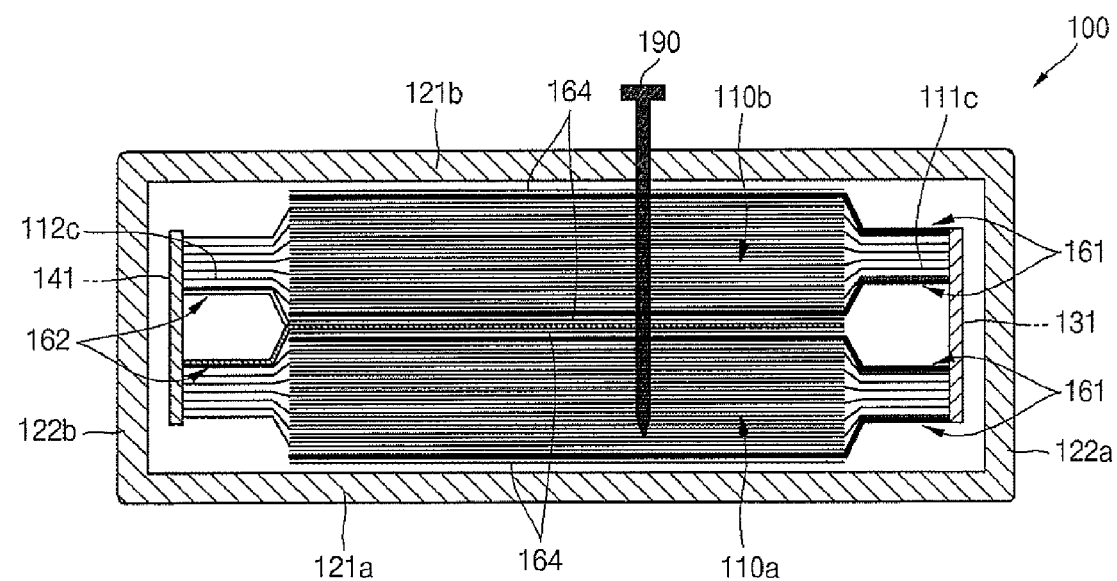

FIGS. 4A and 4B are horizontal cross-sectional views illustrating states in which an inner short circuit is formed by a nail penetrating the secondary battery 100.

Referring to FIG. 4A, a nail 190 or the like sequentially penetrates the wide side part 121a of the case 120 at the front side thereof, a first one of the first short circuit inducing members 161, the first electrode assembly 110a, a second one of the first short circuit inducing members 161, the second short circuit inducing member 162, a third one of the first short circuit inducing members 161, and the second electrode assembly 110b. In this case, a short circuit is formed between the case 120 and the first one of the first short circuit inducing members 161, so as to consume energy from the secondary battery 100. In addition, a short circuit is formed between the second short circuit inducing member 162 and the second one of the first short circuit inducing members 161, so as to consume energy from the secondary battery 100. In addition, a short circuit is formed between the second short circuit inducing member 162 and the third one of the first short circuit inducing members 161, so as to consume energy from the secondary battery 100. Thus, as a whole, the secondary battery 100 is prevented or substantially prevented from generating heat and igniting.

The order of the first to third ones of the first short circuit inducing members 161 is set in a direction away from the wide side part 121a.

Referring to FIG. 4B, the nail 190 or the like sequentially penetrates the wide side part 121b of the case 120 at the rear side thereof, a first one of the first short circuit inducing members 161, the second electrode assembly 110b, a second one of the first short circuit inducing members 161, the second short circuit inducing member 162, a third one of the first short circuit inducing members 161, and the first electrode assembly 110a. In this case, a short circuit is formed between the case 120 and the first one of the first short circuit inducing members 161, so as to consume energy from the secondary battery 100. In addition, a short circuit is formed between the second short circuit inducing member 162 and the second one of the first short circuit inducing members 161, so as to consume energy from the secondary battery 100. In addition, a short circuit is formed between the second short circuit inducing member 162 and the third one of the first short circuit inducing members 161, so as to consume energy from the secondary battery 100. Thus, as a whole, the secondary battery 100 is prevented or substantially prevented from generating heat and igniting.

The order of the first to third ones of the first short circuit inducing members 161 is set in a direction away from the wide side part 121b.

Thus, the effect when the nail 190 penetrates the wide side part 121a of the case 120 is the same as the effect when the nail 190 penetrates the wide side part 121b of the case 120. In addition, since the first short circuit inducing members 161 and the second short circuit inducing member 162 are disposed between the first and second electrode assemblies 110a and 110b, heat and ignition are efficiently prevented or substantially prevented from being generated between the first and second electrode assemblies 110a and 110b.

FIGS. 5A to 5D are schematic views illustrating electrical conductivity and heating states when an inner short circuit is formed, according to an embodiment of the present invention. FIGS. 5A to 5D are based on experimental results according to the present invention.

Figure 5A:
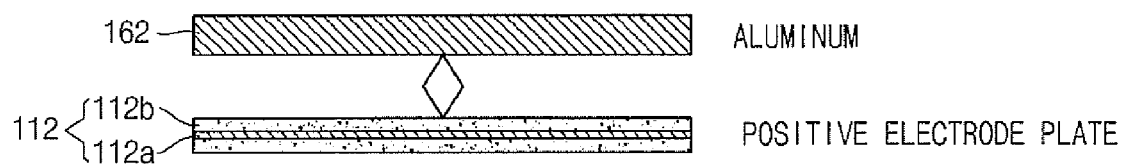
FIGS. 5A to 5D are schematic views illustrating electrical conductivity and heating states when an inner short circuit is formed, according to an embodiment of the present invention.

Referring to FIG. 5A, when the second short circuit inducing member 162 formed of aluminum was short-circuited to the second electrode plate 112 including the second active material 112b as a lithium-based oxide, electrical conductivity between the second short circuit inducing member 162 and the second electrode plate 112 was high and the amount of heat generated was large. Thus, in this case, energy is quickly discharged from a secondary battery, but the possibility of burning of the secondary battery is increased.

Figure 5B:
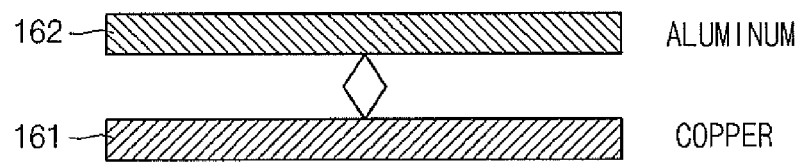

Referring to FIG. 5B, when the first short circuit inducing member 161 formed of copper was short-circuited to the second short circuit inducing member 162 formed of aluminum, electrical conductivity between the first short circuit inducing member 161 and the second short circuit inducing member 162 was highest, and the amount of heat generated was smallest. Thus, in this case, energy is most quickly discharged from a secondary battery, and the possibility of burning of the secondary battery is substantially zero.

Figure 5C:
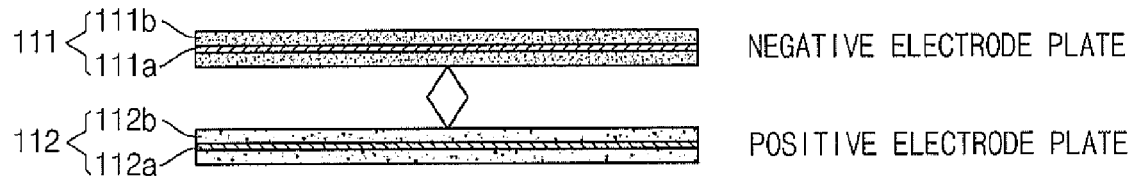

Referring to FIG. 5C, when the first electrode plate 111 including the first active material 111b as graphite was short-circuited to the second electrode plate 112 including the second active material 112b as a lithium-based oxide, electrical conductivity between the first and second electrode plates 111 and 112 was lowest, and the amount of heat generated was largest. Thus, in this case, energy is most slowly discharged from a secondary battery, and the possibility of burning of the secondary battery is highest.

Figure 5D:
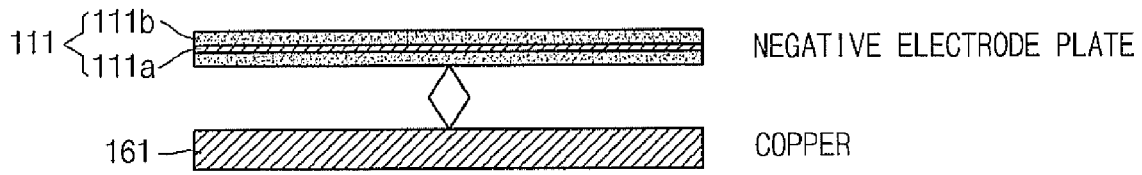

Referring to FIG. 5D, when the first electrode plate 111 including the first active material 111b as graphite was short-circuited to the first short circuit inducing member 161 formed of copper, electrical conductivity between the first electrode plate 111 and the first short circuit inducing member 161 was low, and the amount of heat generated was small. Thus, in this case, energy is slowly discharged from a secondary battery, but the possibility of burning of the secondary battery is substantially zero.

Thus, according to the present invention, when the first short circuit inducing member 161 formed of copper is short-circuited to the second short circuit inducing member 162 (or the case 120) formed of aluminum, energy is most quickly discharged from the secondary battery 100, and the possibility of burning and heating of the secondary battery 100 is substantially zero. Therefore, according to an embodiment of the present invention, when a structure as described above with reference to FIG. 5B is disposed between an electrode assembly and a case and between electrode assemblies, the safety and reliability of a secondary battery are improved.

Figure 6:
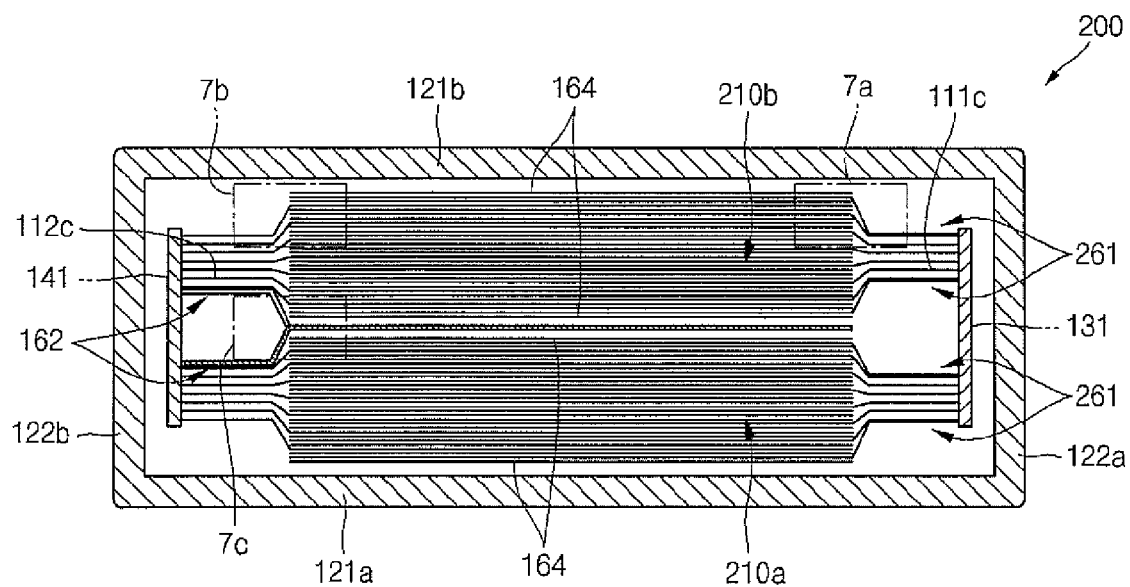
FIG. 6 is a horizontal cross-sectional view of a secondary battery according to another embodiment of the present invention.

FIG. 6 is a horizontal cross-sectional view illustrating a secondary battery according to another embodiment of the present invention.

Referring to FIG. 6, a secondary battery 200 according to another embodiment of the present invention includes a first electrode plate 211 forming a first short circuit inducing member 261. That is, in one embodiment, instead of the second electrode plate 112 (e.g., an electrode plate having a positive polarity), a portion of a first electrode plate 211 (e.g., an electrode plate having a negative polarity) of a first electrode assembly 210a is wound at least one time around the outermost portion of the first electrode assembly 210a, and functions as the first short circuit inducing member 261. Also, in one embodiment, instead of the second electrode plate 112, a portion of a first electrode plate 211 of a second electrode assembly 210b is wound at least one time around the outermost portion of the second electrode assembly 210b, and functions as a first short circuit inducing member 261. The portions of the first short circuit inducing members 261 wound around the outermost portions of the first and second electrode assemblies 210a and 210b, are electrically connected to first non-coating portions 111c of the first electrode plates 211.

A second short circuit inducing member 162 is disposed between the first and second electrode assemblies 210a and 210b, and is electrically connected to second non-coating portions 112c of the second electrode plates 112 of the first and second electrode assemblies 210a and 210b.

Insulating plates 164 are disposed between the case 120 and the first short circuit inducing members 261. In addition, insulating plates 164 are disposed between the first short circuit inducing members 261 and the second short circuit inducing member 162.

Figure 7A:
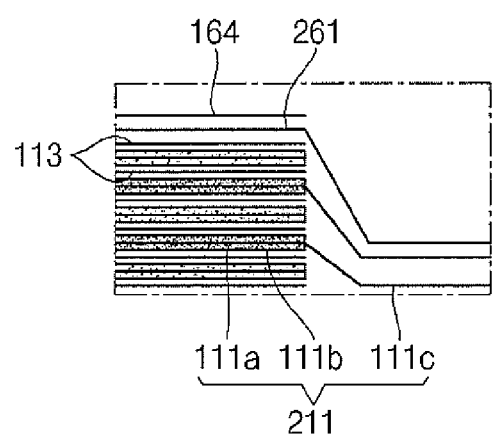
FIGS. 7A to 7C are enlarged views illustrating regions 7a to 7c, respectively, of FIG. 6.
Figure 7B:
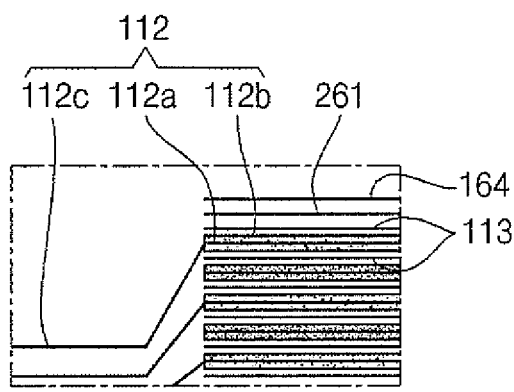
Figure 7C:
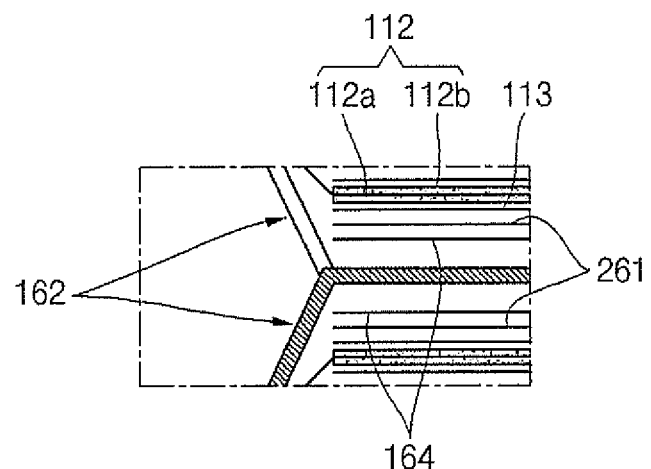

FIGS. 7A to 7C are enlarged views illustrating regions 7a to 7c, respectively, of FIG. 6.

In one embodiment, referring to FIGS. 7A and 7B, the portion of the first electrode plate 211 on which a first active material 111b is not formed is wound at least one time around the outermost portion of the second electrode assembly 210b, thereby forming the first short circuit inducing member 261. The insulating plate 164 is disposed between the case 120 and the first short circuit inducing member 261 wound around the outermost portion, to electrically insulate the case 120 and the first short circuit inducing member 261 from each other.

Referring to FIG. 7C, the second short circuit inducing member 162 is substantially disposed between the first short circuit inducing members 261 wound around the outermost portions of the first electrode assembly 210a and the second electrode assembly 210b. Since the insulating plates 164 are disposed between the first short circuit inducing members 261 and the second short circuit inducing member 162, the first short circuit inducing members 261 are electrically insulated from the second short circuit inducing member 162.

Figure 8:
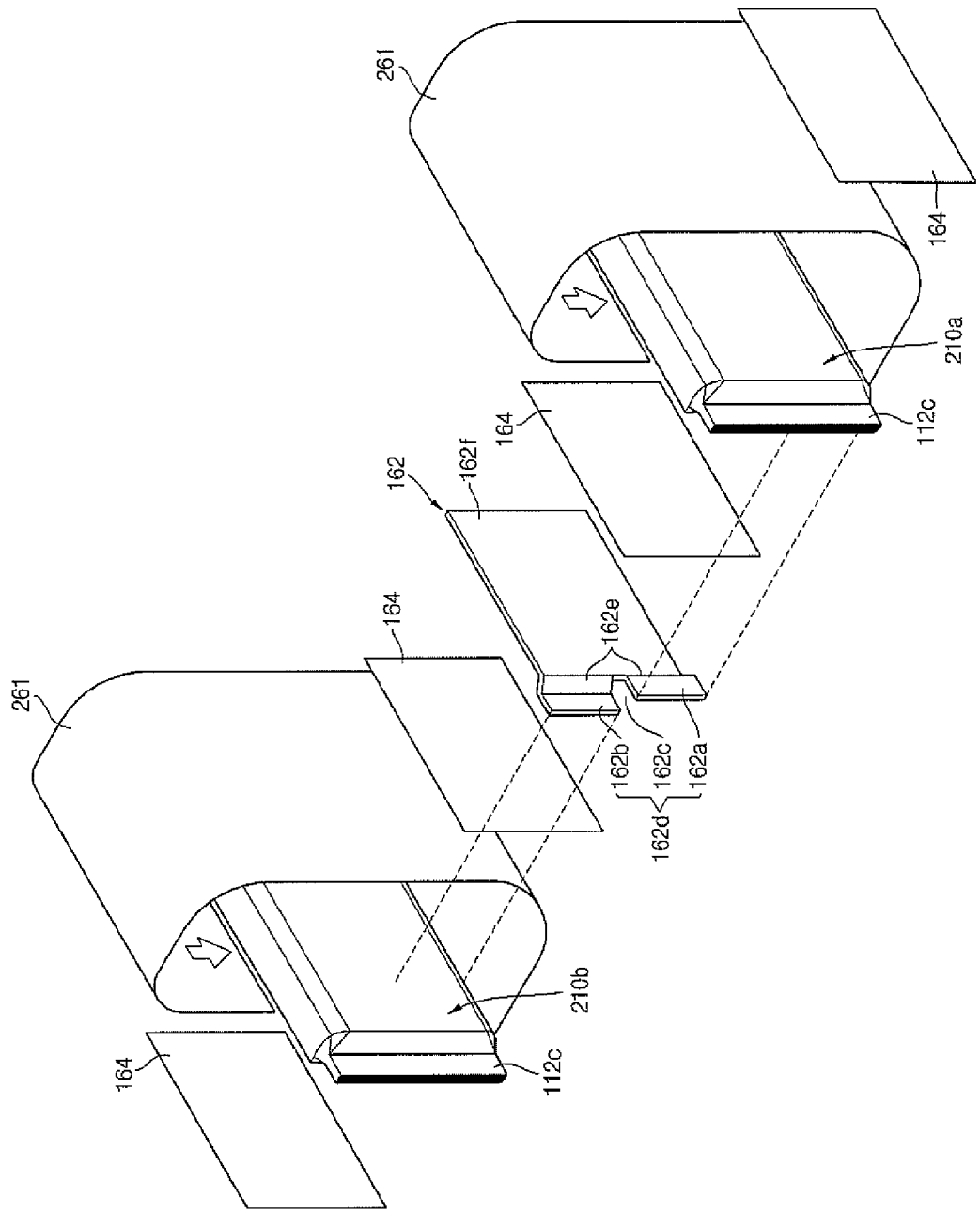
FIG. 8 is an exploded perspective view illustrating first and second electrode assemblies and first and second short circuit inducing members of the secondary battery of FIG. 6.

FIG. 8 is an exploded perspective view illustrating the first and second electrode assemblies and the first and second short circuit inducing members of the secondary battery 200.

Referring to FIG. 8, according to one embodiment, the first short circuit inducing members 261 are formed around the first and second electrode assemblies 210a and 210b by further extending the portions of the first electrode plates 211 on which the first active material 111b is not formed, and winding the portions of the first electrode plates 211 at least one time around the outermost portions of the first electrode assembly 210a and the second electrode assembly 210b. As described above, the second short circuit inducing member 162 is disposed between the first and second electrode assemblies 210a and 210b and is electrically connected to the second non-coating portions 112c of the second electrode plates 112 of the first and second electrode assemblies 210a and 210b.

As such, the secondary battery 200 according to an embodiment of the present invention does not require the first short circuit inducing member 161 of the secondary battery 100 described above, and, thus, a manufacturing process of the secondary battery 200 is further simplified. Furthermore, when the nail 190 or the like penetrates the secondary battery 200 from a cap plate to the bottom of the case 120, or from the bottom of the case 120 to the cap plate, a low-resistance short circuit is formed within the secondary battery 200, thereby efficiently preventing or substantially preventing overheating and igniting of the secondary battery 200.

According to an embodiment of the present invention, since short circuit inducing members are disposed not only on the outermost ones of electrode assemblies within a secondary battery, but also between the electrode assemblies within the secondary battery, all of the electrode assemblies are prevented or substantially prevented from being ignited and/or excessively heated, regardless of a penetration depth of a nail.

In addition, since a positive electrode short circuit inducing member and a negative electrode short circuit inducing member are disposed together between the first and second electrode assemblies, even though an inner short circuit is formed between the first and second electrode assemblies, current from the inner short circuit can efficiently flow to the outside along the positive electrode short circuit inducing member and the negative electrode short circuit inducing member. Thus, even though an inner short circuit is formed between the first and second electrode assemblies, igniting and excessive heating thereof are prevented or substantially prevented. As such, a secondary battery according to embodiments of the present invention is suited for use in an electric vehicle or a hybrid vehicle.

According to an embodiment of the present invention, the positive electrode short circuit inducing member is formed of aluminum or an aluminum alloy, and the negative electrode short circuit inducing member is formed of copper or a copper alloy, improving the performance, safety, and reliability of the secondary battery.

While some exemplary embodiments of a secondary battery have been described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and equivalents thereof.

What is claimed is:

1. A secondary battery comprising:
a first electrode assembly;
a second electrode assembly;
a case accommodating the first and second electrode assemblies;
a first terminal part electrically connected to the first and second electrode assemblies, and exposed to an outside of the case, the first terminal part having a first polarity;
a second terminal part electrically connected to the first and second electrode assemblies, the second terminal, part having a second polarity opposite the first polarity; and
a plurality of short circuit inducing members comprising a plurality of first short circuit inducing members electrically connected to the first terminal part and a second short circuit inducing member electrically connected to the second terminal part, a first one of the first short circuit inducing members being between the first electrode assembly and the case, a second one of the first short circuit inducing members being between the second electrode assembly and the case, and the second short circuit inducing member being between the first electrode assembly and the second electrode assembly,
wherein the first one of the first short circuit inducing members, the first electrode assembly, the second short circuit inducing member, and the second electrode assembly are sequentially arranged along a line of penetration extending through a side part of the case, and
wherein, in a non-short-circuited state between the first and second terminal parts, each of the plurality of first short circuit inducing members is electrically connected to the first terminal part, and the second short circuit inducing member is electrically connected to the second terminal part.

2. The secondary battery as claimed in claim 1, wherein the plurality of first short circuit inducing members comprises:
the first one of the first short circuit inducing members and a third one of the first short circuit inducing members arranged at opposite side surfaces of the first electrode assembly, and a fourth one of the first short circuit inducing members and the second one of the first short circuit inducing members arranged at opposite side surfaces of the second electrode assembly.

3. The secondary battery as claimed in claim 2,
wherein each of the first and second electrode assemblies comprises:
a first electrode plate, a second electrode plate, and a separator between the first and second electrode plates;
a first non-coating portion of the first electrode plate, the first non-coating portion not coated with a first active material and protruding from a side of the separator; and
a second non-coating portion of the second electrode plate, the second non-coating portion not coated with a second active material and protruding from another side of the separator,
wherein first short circuit inducing members of the plurality of first short circuit inducing members are connected to the first non-coating portions of the first and second electrode assemblies, and
wherein the second short circuit inducing member is connected to the second non-coating portion of at least one of the first electrode assembly or the second electrode assembly.

4. The secondary battery as claimed in claim 3, wherein the second short circuit inducing member is connected to the second non-coating portions of both the first and second electrode assemblies.

5. The secondary battery as claimed in claim 4, wherein the second short circuit inducing member comprises a first region connected to the second non-coating portion of the first electrode assembly, a second region connected to the second non-coating portion of the second electrode assembly, and a cut part between the first and second regions.

6. The secondary battery as claimed in claim 3,
wherein the first short circuit inducing members are portions of the first electrode plates wound around outermost portions of the respective first and second electrode assemblies, and
wherein the second short circuit inducing member has a substantially tetragonal plate shape between first short circuit inducing members of the plurality of first short circuit inducing members arranged between the first and second electrode assemblies.

7. The secondary battery as claimed in claim 6, wherein the first short circuit inducing members wound at least one time around the outermost portions of the respective first and second electrode assemblies are not coated with the first active material.

8. The secondary battery as claimed in claim 2, wherein the case and the second short circuit inducing member have a same polarity.

9. The secondary battery as claimed in claim 2, wherein first short circuit inducing members of the plurality of first short circuit inducing members and the second short circuit inducing member have substantially tetragonal plate shapes.

10. The secondary battery as claimed in claim 2, wherein the first short circuit inducing members comprise copper or a copper alloy.

11. The secondary battery as claimed in claim 2, wherein the second short circuit inducing member comprises aluminum or an aluminum alloy.

12. The secondary battery as claimed in claim 2, further comprising an insulating plate between a first short circuit inducing member of the plurality of first short circuit inducing members and the case.

13. The secondary battery as claimed in claim 2, further comprising an insulating plate between a first short circuit inducing member of the plurality of first short circuit inducing members and the second short circuit inducing member.

14. A secondary battery comprising:
a plurality of electrode assemblies;
a case accommodating the electrode assemblies;
a plurality of terminal parts electrically connected to the electrode assemblies, and exposed to an outside of the case, a first terminal part of the plurality of first terminal parts having a first polarity, and a second terminal part of the plurality of terminal parts having a second polarity opposite the first polarity; and
a plurality of short circuit inducing members comprising a plurality of first short circuit inducing members electrically connected to the first terminal part and at least one second short circuit inducing member electrically connected to the second terminal part, a first one of the first short circuit inducing members being between a first electrode assembly of the plurality of electrode assemblies and the case, a second one of the first short circuit inducing members being between a second electrode assembly of the plurality of electrode assemblies and the case, and the at least one second short circuit inducing member being between the electrode assemblies,
wherein the first one of the first short circuit inducing members, the first electrode assembly, the at least one second short circuit inducing member, and the second electrode assembly are sequentially arranged along a line of penetration extending through a side part of the case, and
wherein, in a non-short-circuited state between the first and second terminal parts, each of the plurality of first short circuit inducing members is electrically connected to the first terminal part, and the at least one second short circuit inducing member is electrically connected to the second terminal part.

15. The secondary battery as claimed in claim 14, wherein the plurality of first short circuit inducing members comprises:
a respective pair of the first short circuit inducing members arranged at opposite side surfaces of each of the electrode assemblies.

* * * * *